(12) United States Patent
Hong et al.

(10) Patent No.: US 12,287,870 B2
(45) Date of Patent: Apr. 29, 2025

(54) SECURITY POLICY AND AUDIT LOG TWO WAY INQUIRY, COLLATION, AND TRACKING SYSTEM AND METHOD

(71) Applicant: SECUVE.CO., LTD., Seoul (KR)

(72) Inventors: Ki Yoong Hong, Seoul (KR); Kyu Ho Lee, Gwangmyeong-si (KR); Sung Geun Lee, Seoul (KR); Joo Yang Son, Seoul (KR); Jong Man Song, Gwangmyeong-si (KR)

(73) Assignee: SECUVE.CO., LTD., Seoul (KR)

( * ) Notice: Subject to any disclaimer, the term of this patent is extended or adjusted under 35 U.S.C. 154(b) by 357 days.

(21) Appl. No.: 16/345,785

(22) PCT Filed: Mar. 21, 2019

(86) PCT No.: PCT/KR2019/003325
§ 371 (c)(1),
(2) Date: Mar. 11, 2021

(87) PCT Pub. No.: WO2019/231089
PCT Pub. Date: Dec. 5, 2019

(65) Prior Publication Data
US 2021/0279329 A1    Sep. 9, 2021

(30) Foreign Application Priority Data
Jun. 1, 2018 (KR) .......... 10-2018-0063167

(51) Int. Cl.
*G06F 21/55* (2013.01)
*G06F 21/54* (2013.01)

(52) U.S. Cl.
CPC ............ *G06F 21/552* (2013.01); *G06F 21/54* (2013.01); *G06F 21/554* (2013.01)

(58) Field of Classification Search
CPC ....... G06F 21/552; G06F 21/54; G06F 21/554
See application file for complete search history.

(56) References Cited

U.S. PATENT DOCUMENTS 9,559,800 B1 * 1/2017 Giles .................. H04J 13/18
2012/0290850 A1 * 11/2012 Brandt ................. G06F 21/575
713/189

FOREIGN PATENT DOCUMENTS

| CN | 104517055 A | * | 4/2015 | ........... G06F 21/608 |
| JP | 2008250728 A | * | 10/2008 | |
| KR | 10-2009-0044202 A | | 5/2009 | |

OTHER PUBLICATIONS

A. Binun* E. Gudes; Policy and state based secure wrapper and its application to mobile agents; 2003 First Latin American Web Congress (2003, pp. 14-26); (Year: 2003).*

(Continued)

*Primary Examiner* — Luu T Pham
*Assistant Examiner* — Chao Wang
(74) *Attorney, Agent, or Firm* — NKL Law; Jae Youn Kim

(57) ABSTRACT

The present invention relates to a security policy and audit log two-way inquiry, collation, and tracking system and method capable of effectively inquiring and confirming various pieces of log information generated due to setting and change of various security policies, and capable of inquiring and confirming a security policy related to log information based on the collected log information. According to the present invention, it is possible to inquire, collate, and track logs generated and recorded by the various security policies, it is possible to inquire, collate, and track the security policy applied to the collected log, and it is possible to inquire, collate, and track the security policy and the log in two ways and in real time.

6 Claims, 10 Drawing Sheets

(56) References Cited

OTHER PUBLICATIONS

M. Aramudhan; User assigned security policy framework for m-commerce applications; 2008 International Conference on Computer and Communication Engineering (2008, pp. 148-150); (Year: 2008).*

Toshihiro Uchibayashi• Masahiro Hiji• Takuo Suganuma• Yuichi Hashi• Seira Hidano; Proposed data audit system enhances use in accordance with the data owner's policy; 2016 11th International Conference on Knowledge, Information and Creativity Support Systems (KICSS) (2016, pp. 1-5); (Year: 2016).*

* cited by examiner

[SECURITY POLICY EXAMPLE]
- Chain INPUT (Policy ACCEPT)

target    proto    opt    source           destination
  DROP      all      --     111.222.33.44    anywhere

| SUBJECT | OBJECT | ACTION | PERMISSION/ DENIAL | OTHERS |
|---|---|---|---|---|
| 111.222.33.44 | proto:all | INPUT | DROP | anywhere |

- user=root target=/home/test oper=rw policy=allow def_policy=deny

| SUBJECT | OBJECT | ACTION | PERMISSION/ DENIAL | OTHERS |
|---|---|---|---|---|
| user=root | /home/test | rw | allow | def_policy=deny |

FIG. 4

[INTEGRATED SECURITY POLICY HISTORY DB STORAGE EXAMPLE]

| SECURITY SYSTEM ID | POLICY IDENTIFICATION INFORMATION | | | | | SECURITY POLICY | APPLICATION ID |
|---|---|---|---|---|---|---|---|
| | SECURITY POLICY ID | ITEM 1 (SUBJECT) | ITEM 2 (OBJECT) | ITEM 3 (ACTION) | ITEM N (OTHERS) | | |
| | 00000001 | 111.222 .33.44 | proto:all | INPUT | | Chain INPUT (Policy ACCEPT) target proto opt source   destination DROP  all  --  111.222.33.44  anywhere | Req_0000000001 |
| | 00000002 | | | | | user=root target=/home/test oper= rw policy=allow def_policy=deny | Req_0000000002 |
| | 00000003 | ... | ... | ... | ... | ... | Req_0000000003 |

FIG. 5

[AUDIT LOG EXAMPLE]
- EXAMPLE OF AUDIT LOG RECORDED BY INCLUDING SECURITY POLICY ID (APPROCH CONTROL SECURITY SOFTWARE) file|2017-09-22 03:34:05.324357|root|root|root|none|14807|14758|14758|"cat"|192.168.150.59|"test" objrole=""test""|read|"test.c"|"/home/test/test.c"|code=0x0 msg="Success" policyid="000000002"|success|normal|info

- EXAMPLE OF AUDIT LOG RECORDED BY INCLUDING POLICY CONFIGURATION INFORMATION (LINUX HOST FIREWALL (iptables)) INPUT:DROP:IN=eth1 OUT= MAX=aa:bb:cc:dd:ee:ff SRC:111.222.33.44 DST=1.2.3.4 LEN=48 TOS=0x00 PREC=0x00 TTL=117 ID=1 PROTO=TCP SPT=7382 DPT=80 WINDOW=1024 RES=0x00

FIG. 6

[POLICY IDENTIFICATION INFORMATION EXTRACTION EXAMPLE]
- AUDIT LOG INCLUDING SECURITY POLICY ID (APPROCH CONTROL SECURITY SOFTWARE)
file|2017-09-22 03:34:05.324357|root|root|root|none|14807|14758|14758|
"cat"|192.168.150.59|"subrole="""test""" objrole="""test""""|read|"test.c"|"/home/test/test.c"|code=0x0 msg="Success"
policyid="00000002"|success |normal|info

- AUDIT LOG DOES NOT INCLUDE SECURITY POLICY ID (LINUX HOST FIREWALL (iptables))
INPUT:DROP:IN=eth1 OUT= MAX=aa:bb:cc:dd:ee:ff SRC:111.222.33.44 DST=1.2.3.4 LEN=48 TOS=0x00
PREC=0x00 TTL=117 ID=1 PROTO=TCP SPT=7382 DPT=80 WINDOW=1024 RES=0x00

FIG. 7

[AUDIT LOG DB STORAGE EXAMPLE]

| AUDIT LOG DB |||||||||
|---|---|---|---|---|---|---|---|---|
| AUDIT LOG ||||||| SECURITY POLICY ID | SECURITY SYSTEM ID |
| ITEM 1 (TIME) | ITEM 2 (SUBJECT) | ITEM 3 (OBJECT) | ITEM 4 (ACTION) | ITEM 5 | ITEM 6 | ITEM N | | |
| 2017-09-22 03:34 :05.324357 | root | /home/test /test.c | read | file | success | ... | 00000002 | |
| 2018-01-30 15:00 :03.123456 | SRC=111 .222.33.44 | PROTO=TCP | INPUT | DROP | DST=1.2.3.4 | ... | 00000001 | |

FIG. 8

SECURITY POLICY AND AUDIT LOG TWO WAY INQUIRY, COLLATION, AND TRACKING SYSTEM AND METHOD

BACKGROUND

The present invention relates to a security policy and audit log two-way inquiry, collation, and tracking system and method capable of confirming current and past security policies and logs by inquiring, collating, and tracking the current and past security policies and logs in two ways and in real time.

Laid-open Patent No. 10-2009-0044202 discloses a web security service method and system using bypass invasion detection and parameter falsification invasion detection of a web page capable of enforcing a security system by constructing a web security system capable of detecting bypass invasion of the web page and invasion due to web page parameter falsification.

In Laid-open Patent No. 10-2009-0044202, log files generated from a web server are collected, the collected log files are stored, an access order of the web page to which access is attempted is analyzed by using the log files, it is determined whether or not the access order is equal to a normal access order of the web page, and in a case in which it is determined that the attempt is abnormal access attempt, a report is generated, and the report is transmitted to a manager terminal.

However, In Laid-open Patent No. 10-2009-0044202, it is difficult to collate and confirm a security policy applied based on each piece of log information, and there is a problem that it is difficult to inquire and confirm a log generated and recorded based on each piece of security policy information.

In addition, it is impossible to inquire, collate, track, and confirm current security policy and log in two ways and in real time, and it is impossible to inquire, collate, track, and confirm past security policy and log that are set in the past.

Hacking and security invasion attacks are evolving day by day. However, even though log files are collected, in a case in which a security policy related to the log information cannot be analyzed by comparing the log file with the security policies configured in the security system, it is hard to quickly and systematically analyze the cause of the hacking and security invasion accident and respond to such accidents.

In addition, in a case in which the manager analyzes the collected log files by comparing the log files with the security policies one by one, it takes a long time and is economically inefficient.

As a result, it is very difficult to clearly compare and analyze the policy generating the corresponding log among the security policies of the organization in a current situation where various security related logs such as big data integration log are increasing exponentially. Therefore, the cause analysis and countermeasures of the hacking and security invasion accidents are not able to be performed quickly and systematically.

When considering the above situation comprehensively, it is necessary to have a security solution that compares and analyzes a large amount of log information with the security policies in two ways and in real time to quickly identify the cause of the security invasion accident and quickly come up with countermeasures.

SUMMARY

The present invention has been made in order to solve the above-described problems, and is to provide a security policy and audit log two-way inquiry, collation, and tracking system and method capable of effectively inquiring and confirming various pieces of log information generated due to setting and change of various security policies, and capable of inquiring and confirming a security policy related to the log information based on the collected log information.

That is, the present invention is to provide a system and method capable of recording an audit log when an event that violates or complies with a security policy occurs based on existing security policies as well as new security policies, and inquiring, collating, and tracking a log related to the security policy and the security policy related to the log by using policy identification information (security policy ID or policy configuration information) recorded in both the security policy and an audit log.

In order to achieve the above object, the present invention includes: a security policy setting unit configured to record a security policy in an integrated security policy history DB by assigning unique policy identification information whenever the security policy is generated and changed, manage the security policy, and transmit security policy information to a security software agent, wherein the policy identification information is configured with a security policy ID or the security policy ID and policy configuration information; the security software agent configured to apply the security policy received by the security policy setting unit and generate an audit log by including a unique security policy ID or the policy configuration information related to the log in the log information when a log complying with the security policy or a log violating the security policy is generated; an audit log collection unit configured to collect the audit log generated by the security software agent, extract the security policy ID or the policy configuration information from the audit log, map collected audit log to the policy identification information by setting the security policy ID or the policy configuration information as the policy identification information, and record the mapped audit log and policy identification information in the audit log DB; and a two-way inquiry tracking unit configured to inquire, collate and track the audit log related to the security policy, and inquire, collate, and track the security policy related to the audit log by comparing the policy identification information recorded in the integrated security policy history DB with the policy identification information recorded in the audit log DB.

In order to achieve the above object, the present invention includes: a security policy setting step of recording and managing a security policy in an integrated security policy history DB by assigning unique policy identification information whenever the security policy is generated and changed and transmitting security policy information to a security software agent, wherein the policy identification information consists of a security policy ID or the security policy ID and policy configuration information; a security policy application step of, by the security software agent, applying the received security policy and generating an audit log by including a unique security policy ID or the policy configuration information related to the generated log in the log information when a log complying with the security policy or a log violating the security policy is generated; a collection step of collecting the generated audit log, extracting the security policy ID or the policy configuration information from the audit log, mapping collected audit log to the policy identification information by setting the security policy ID or the policy configuration information as the policy identification information, and recording the mapped audit log and policy identification information in the audit log DB; and a two-way inquiry tracking step of comparing the policy identification information recorded in an integrated security policy history DB with the policy identification information recorded in the audit log DB to inquire, collate and track the audit log related to the security policy, and inquire, collate, and track the security policy related to the audit log.

According to the present invention of the above-described configuration, the following effects can be achieved. First, it is possible to inquire, collate, and track logs generated and recorded by each security policy, it is possible to inquire, collate, and track the security policy applied to the collected log, and it is possible to inquire, collate, and track the security policy and the log in two ways and in real time.

In addition, it is possible to collate and track with the security policy from past to present at the time of log analysis such as large amount of data such as a big data integration log. Therefore, it is possible to clearly compare and analyze the security policy generating the corresponding log among security policies of an organization, and thus cause analysis and countermeasures of hacking and security invasion accidents are able to be performed quickly and systematically.

Furthermore, it is possible to confirm applicant information for the security policy by comparing the security policy DB with the application information DB. In addition, it is possible to confirm the security policy for the audit log by comparing the audit log DB with the security policy DB and it is possible to confirm the application information in the application information DB by using the security policy. Thus, it is possible to track the applicant information from the audit log.

The details of one or more embodiments are set forth in the accompanying drawings and the description below. Other features will be apparent from the description and drawings, and from the claims.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 4 is a diagram illustrating an example of a security policy;

FIG. 5 is a diagram illustrating an example of an integrated security policy history DB;

FIG. 6 is a diagram illustrating an example of an audit log;

FIG. 7 is a diagram illustrating policy identification information extraction example;

FIG. 8 is a diagram illustrating an example of an audit log DB;

DETAILED DESCRIPTION OF THE EMBODIMENTS

Figure 1:
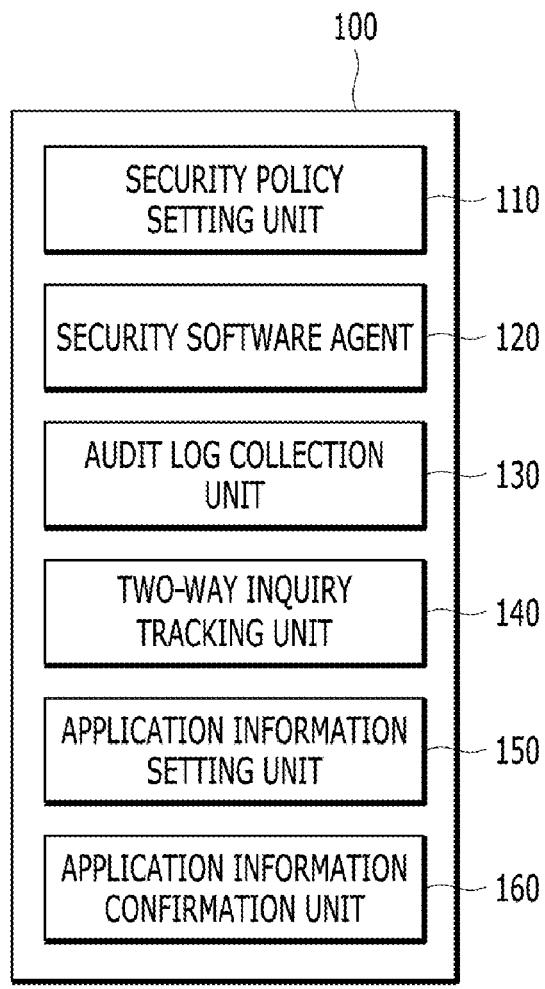
FIG. 1 is a block diagram of a security policy and audit log two-way inquiry, collation, and tracking system according to an embodiment of the present invention.

Advantages and features of the present invention, and implementation methods thereof will be clarified through following embodiments described with reference to the accompanying drawings.

The present disclosure may, however, be embodied in different forms and should not be construed as limited to the embodiments set forth herein.

In this specification, these embodiments are provided so that this disclosure will be thorough and complete, and will fully convey the scope of the present invention to those skilled in the art.

Also, the present invention is only defined by scopes of claims.

Accordingly, in some embodiments, well-known components, well-known device operations, and well-known techniques will not be described in detail to avoid ambiguous interpretation of the present invention.

Also, like reference numerals refer to like elements throughout. In the following description, the technical terms in this specification are used (mentioned) only for explaining a specific exemplary embodiment while not limiting the present invention.

The terms of a singular form may include plural forms unless referred to the contrary. The meaning of "include," "comprise," "including," or "comprising," specifies a component and an operation but does not exclude other components and operations.

Unless terms used in the present invention are defined differently, all terms (including technical and scientific terms) used in this specification have the same meaning as generally understood by those skilled in the art.

Also, unless defined apparently in the description, the terms as defined in a commonly used dictionary are not ideally or excessively construed as having formal meaning.

Hereinafter, exemplary embodiments of the prevent invention will be described below in more detail with reference to the accompanying drawings.

Referring to FIGS. 1 to 11, a security policy and audit log two-way inquiry, collation, and tracking system 100 includes a security policy setting unit 110, a security software agent 120, an audit log collection unit 130, and a two-way inquiry tracking unit 140, and may further include an application information setting unit 150 and the application information confirmation unit 160.

Figure 3:
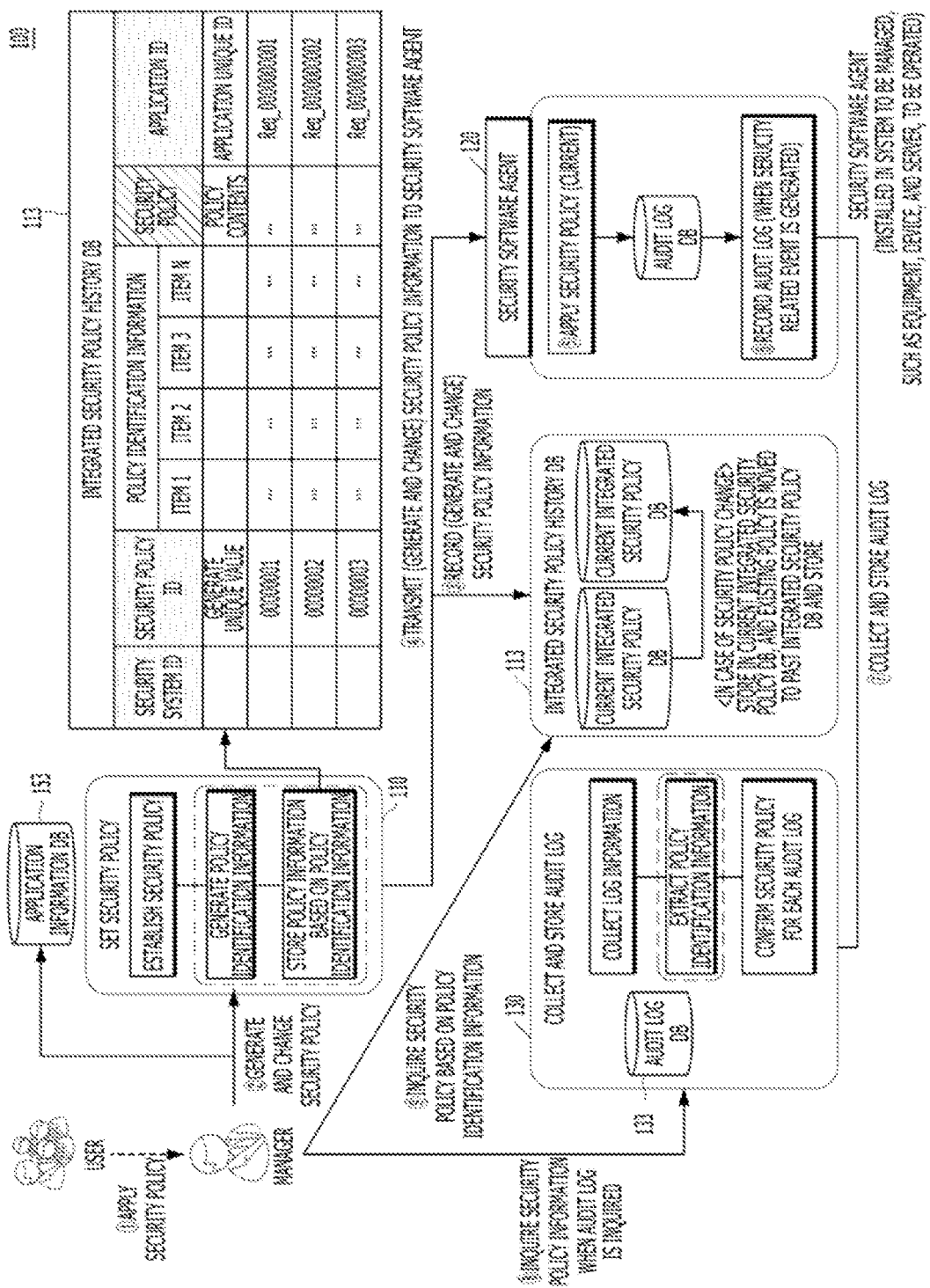
FIG. 3 is a configuration diagram illustrating a relationship among configuration elements of the security policy and audit log two-way inquiry, collation, and tracking system according to an embodiment of the present invention.

Referring to FIGS. 3 to 5, when users apply a security policy, a manager generates and changes the security policy.

The security policy setting unit 110 records and manages a security policy in an integrated security policy history DB 113 by assigning unique policy identification information whenever the security policy is generated and changed and transmits security policy information to a security software agent 120. The policy identification information consists of a security policy ID or the security policy ID and policy configuration information.

The security policy consists of items such as subject, object, action, policy (permission/denial), and constraint, is described as shown in FIG. 4, and is able to distinguish the items.

Referring to FIG. 4, a security policy that blocks an action for accessing all protocols from IP address '111.222.33.44' with Linux host firewall (iptables) and a security policy that allows a user to only 'read/write' for '/home/test' directory are shown.

The policy identification information may be generated by the security policy ID capable of uniquely identifying the security policy or generated by the security policy ID and the policy configuration information.

The policy configuration information is required to be items or a combination of items recorded in the security policy and the audit log. The policy configuration information is mapped with the security policy ID in 1:1, is stored, and managed.

The security policy setting unit 110 generates the policy configuration information consisting of the security policy ID capable of uniquely identifying the security policy or consisting of the security policy ID and multiple items, maps the security policy ID and the security policy or maps the policy configuration information consisting of the security policy ID and multiple items with the security policy, and records the mapped security policy ID and security policy or the mapped policy configuration information and security policy in the integrated security policy history DB 113.

The policy configuration information consists of multiple items including subject information, object information, and action information extracted from the security policy.

The policy configuration information will be described in detail as follows.

The subject information refers to information that is able to identify an actor in a computer system, such as IP (Host) address information, a user account, and a group account.

The object information refers to information that is able to identify an action object in a computer system, such as a file, a directory, IP (Host) address information, and a process.

The action information refers to actions involving an object state change or information flow in a computer system, such as a file/directory (read, write, delete, create, rename, and the like), process (execution, termination), network (incoming, outgoing, and the like).

The security policy setting unit 110 collects predetermined security policies from the security software and sets the policy configuration information including the subject information, the object information, and the action information.

Specifically, the security policy setting unit 110 collects the security policy without the security policy ID of the security software, sets the policy configuration information consisting of the multiple items that include subject information indicating an actor extracted from the security policy or an access path of the actor, object information indicating a target to be accessed through the actor or the access path, and action information indicating contents to be executed with respect to the target to be accessed through the actor or the access path, maps the policy configuration information consisting of the security policy ID and the multiple items to the security policy by assigning the security policy ID, and records the mapped policy configuration information and the security policy in the integrated security policy history DB 113.

Since the security policy ID is not assigned to the existing security policy, the security policy without the security policy ID is collected, and after the policy configuration information configured using the information extracted from the security policy is set, the security policy ID is assigned.

In addition, in a case of the security software to which the security policy ID is able to be applied, the security policy setting unit 110 assigns the security policy ID to the security policy, records the security policy and the assigned security policy ID in the integrated security policy history DB 113, and transmits the security policy information including the security policy ID to the security software agent 120. In a case of the security software to which the security policy ID is not able to be applied, the security policy setting unit 110 sets the policy configuration information with respect to the security policy, assigns the security policy ID, maps the policy configuration information consisting of the security policy ID and the multiple items to the security policy, records the mapped policy configuration information, the security policy, and the assigned security policy ID in the integrated security policy history DB 113, and transmits only the security policy information to the security software agent 120.

In a case in which the security software agent 120 is able to apply the security policy ID to the newly set security policy, the security policy ID is assigned to the security policy, and the security policy information including the security policy ID is transmitted to the security software agent 120. In a case in which the security software agent 120 is not able to apply the security policy ID, the policy configuration information is set, the security policy ID is assigned, but only the security policy information is transmitted to the security software agent 120.

As a result, regarding the security policy for the security software that does not include the security policy ID, the security policy ID and the policy configuration information are mapped with the security policy, and the mapped security policy, security policy ID, and policy configuration information are stored in the integrated security policy history DB 113. Regarding the security policy for the security software including the security policy ID, only the security policy ID is mapped with the security policy, and the mapped security policy and security policy ID stored in the integrated security policy history DB 113.

Referring to FIG. 5, the integrated security policy history DB 113 stores the policy identification information and the security policy by mapping the polity identification information with the security policy. FIG. 5 illustrates an example of the policy identification information and the security policy storage for the two types of security policies described in the security policy example of FIG. 4.

<The security policy ID, the policy configuration information, the security policy, and other information> are recorded and maintained in the integrated security policy history DB 113. Information on the applicant or the manager who requested the security policy setting may be input to <other information>.

The security policy ID uniquely identifies the policy, and the policy configuration information may be a combination of the target security policy items.

The 'subject' and 'action' items selected as the policy configuration information of the security policy ID '00000001' are a combination selected among items recorded in the audit log.

The integrated security policy history DB 113 is configured with a current integrated security policy DB and a past integrated security policy DB. In a case of a security policy change, the new security policy is stored in the current integrated security policy DB, and the existing policy is moved to the past integrated security policy DB and is stored.

The security policy setting unit 110 records the security policy in the integrated security policy history DB 113 by assigning the unique policy identification information, manages the security policy, and transmits the security policy information to the security software agent 120.

The security software agent 120 applies the security policy received by the security policy setting unit 110 and generates the audit log by including the unique security policy ID or the policy configuration information related to the generated log in the log information when a log complying with the security policy or a log violating the security policy is generated. The security software agent 120 may be installed and operated in any device such as a device or a server to be managed.

The security software agent 120 performs a security function by applying the security policy distributed by the security policy setting unit 110. The applied security policy includes the policy identification information (security policy ID or policy configuration information).

The security software agent 120 searches for the corresponding log from the security policy information received by the security policy setting unit 110 when the log complying with the security policy or the log violating the security policy is generated, and in a case in which the corresponding security policy ID of the log is present, the security software agent 120 records the audit log by including the security policy ID in the log.

In a case in which the corresponding security policy ID of the log is not present in the security policy information as a result of the search, since it is impossible to record the security policy ID, the security software agent 120 records the audit log by including the policy configuration information in the log.

Specifically, in a case in which the security software agent 120 is not able to include the security policy ID in the log, the security software agent 120 records the audit log by including the policy configuration information that contains the subject information indicating the actor extracted from the security policy or the access path of the actor, the object information indicating the target to be accessed through the actor or the access path, action information indicating contents to be executed with respect to the target to be accessed through the actor or the access path, and the permission/denial information indicating whether to permit or deny the contents to be executed with respect to the target to be accessed in the log.

Referring to FIG. 6, an example in which the audit log is recorded by including the security policy ID in a case of the access control security software is shown. The audit log is recorded by including the security policy ID "00000002" of the log is recorded. In a case of the security software to which the security policy ID is able to be applied, the audit log may be recorded by including the security policy ID.

In a case of a Linux host firewall, it is not possible to include the security policy ID, so an example of recording the audit log by including the policy configuration information is shown. Action "INPUT", permission or denial "DROP", subject "SRC: 111.222.33.44", object "PROTO=TCP" are included as the policy configuration information. When it is impossible to include the security policy ID in the log because the security software to which the security policy ID is not able to applied or the security software to which the security policy ID is able to applied but the security policy ID is not assigned to the security policy, the audit log is recorded by including the policy configuration information.

The audit log collection unit 130 collects the audit log generated by the security software agent 120, extract the security policy ID or the policy configuration information from the audit log, maps the collected audit log to the policy identification information by setting the security policy ID or the policy configuration information as the policy identification information, and records the mapped audit log and policy identification information in the audit log DB 133.

In a case in which the security policy ID is recorded in the collected audit log, the audit log collection unit 130 extracts the security policy ID and uses the security policy ID as the policy identification information, and in a case in which the security policy ID is not recorded in the collected audit log, the audit log collection unit 130 extracts the policy configuration information, inquires the integrated security policy history DB 113 by using the policy configuration information, obtains the security policy ID, and uses the security policy ID as the policy identification information.

Referring to FIG. 7, the access control security software includes the security policy ID in the audit log. In this case, the item "policyid" is extracted to acquire the security policy ID "00000002".

In a case of the Linux host firewall, the security policy ID is not included, and the policy configuration information "INPUT", "SRC=111.222.33.44", and "PROTO=TCP" are extracted.

The integrated security policy history DB 113 is inquired using the following information. "PROTO=TCP" is included in "PROTO=ALL". The security policy ID "00000001" is obtained, and security system ID information is also obtained.

Referring to FIG. 8, the audit log collection unit 130 maps the collected audit log, the obtained security policy ID, and the security system ID, and records the mapped audit log, the obtained security policy ID, and the security system ID in the audit log DB 133.

The two-way inquiry tracking unit 140 may compare the policy identification information recorded in the integrated security policy history DB 113 with the policy identification information recorded in the audit log DB 133 to inquire, collate and track the audit log related to the security policy, and inquire, collate, and track the security policy related to the audit log.

An application ID applying the security policy for each security policy is allocated to the integrated security policy history DB 113.

Figure 9:
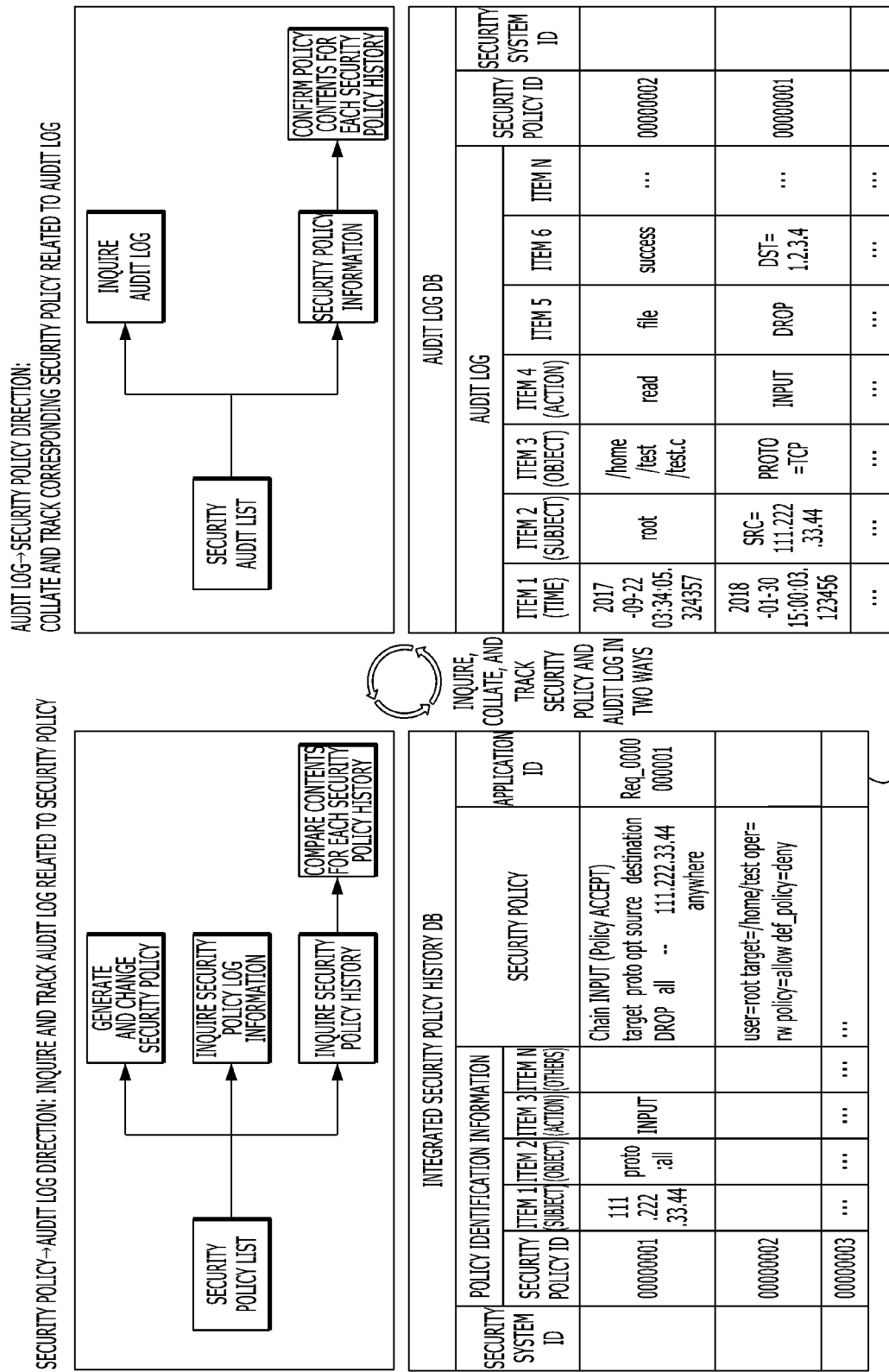
FIG. 9 is a conceptual diagram illustrating a situation where a two-way inquiry, collation, and tracking are performed between a security policy and an audit log in the security policy and audit log two-way inquiry, collation, and tracking system according to an embodiment of the present invention.

Referring to FIG. 9, the audit log related to the security policy may be inquired and tracked in a security policy→audit log direction.

In addition, the security policy related to the audit log may be collated and tracked in an audit log→security policy direction.

Since the security policy ID is commonly included in the integrated security policy history DB 113 and the audit log DB 133, two-way collation and tracking can be performed using the security policy ID.

The security policy setting unit 110 maps the security system ID to each security policy for the security software, and records the security system ID in the integrated security policy history DB 113. The audit log collection unit 130 maps the security system ID for each audit log, and records the security system ID in the audit log DB 133.

The two-way inquiry tracking unit 140 compares the security system ID recorded in the integrated security policy history DB 113 with the security system ID recorded in the audit log DB 133, and performs two-way inquiry, collation, and tracking also with respect to heterogeneous security software.

Although it is impossible to configure all security policies with respect to the heterogeneous security software, it is possible to store the security system ID, the security policy ID, and the policy configuration information in the integrated security policy history DB 113 by collecting the security policy and configuring the policy identification information based on the security policy.

In summary, it is possible to track and confirm a change history of the security policy by comparing policy contents for each security policy history, and it is possible to inquiry, collate, and track the current security policy and audit log in two ways and in real time.

In addition, it is possible to inquiry, collate, and track the past security policy and audit log that are set in the past.

In addition, it is possible to track the security policy applicant information in the audit log by managing the application information by mapping the application information (application ID) of the security policy with the security policy ID.

The application information setting unit 150 records and manages information including the application ID, the applicant information of the security policy, and the security policy application contents in the application information DB 153.

Figure 10:
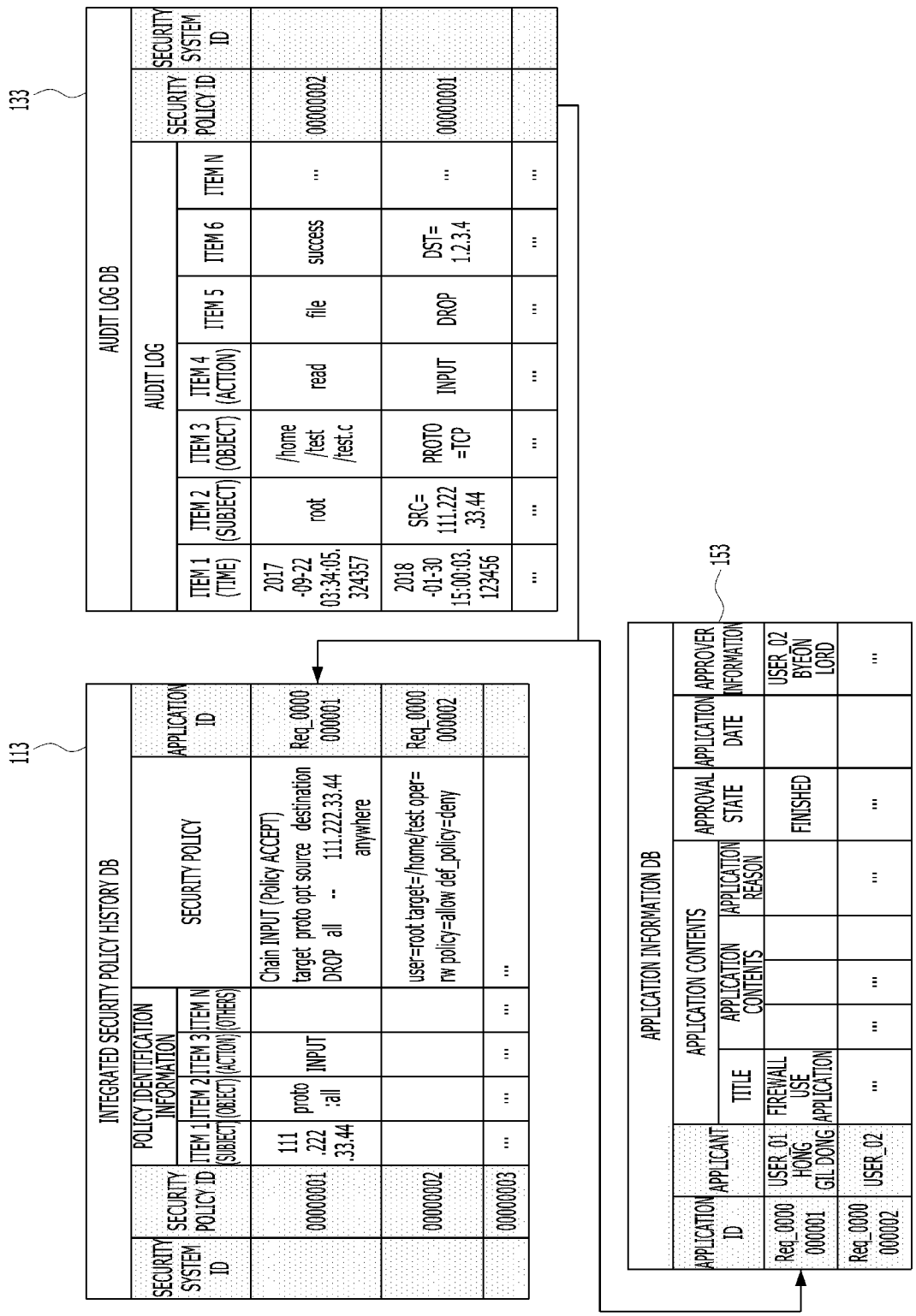
FIG. 10 is a conceptual diagram illustrating a situation where applicant information is confirmed through security policy and audit log information in the security policy and audit log two-way inquiry, collation, and tracking system according to an embodiment of the present invention.

Referring to FIG. 10, the integrated security policy history DB 113 and the application information DB 153 include the application ID. The application ID is an index for connecting the integrated security policy history DB 113 to the application information DB 153.

In other words, the application ID is an index for searching for the applicant and the application contents for each security policy in the integrated security policy history DB 113.

The application information DB 153 includes the application ID, the applicant information, an application date, the application content, and a reason for application.

Referring to FIG. 10, the application information confirmation unit 160 may inquire the application information for the corresponding security policy by inquiring the application information DB 153 based on the application ID of the integrated security policy history DB 113.

In addition, the application information confirmation unit 160 may inquire the security policy contents by obtaining the security policy ID and the security system ID from the audit log DB 133 and then inquiring the integrated security policy history DB 113 using the security policy ID and the security system ID. Furthermore, the application information confirmation unit 160 may inquire the application information DB 153 based on the application ID obtained by inquiring the integrated security policy history DB 113.

Figure 11:
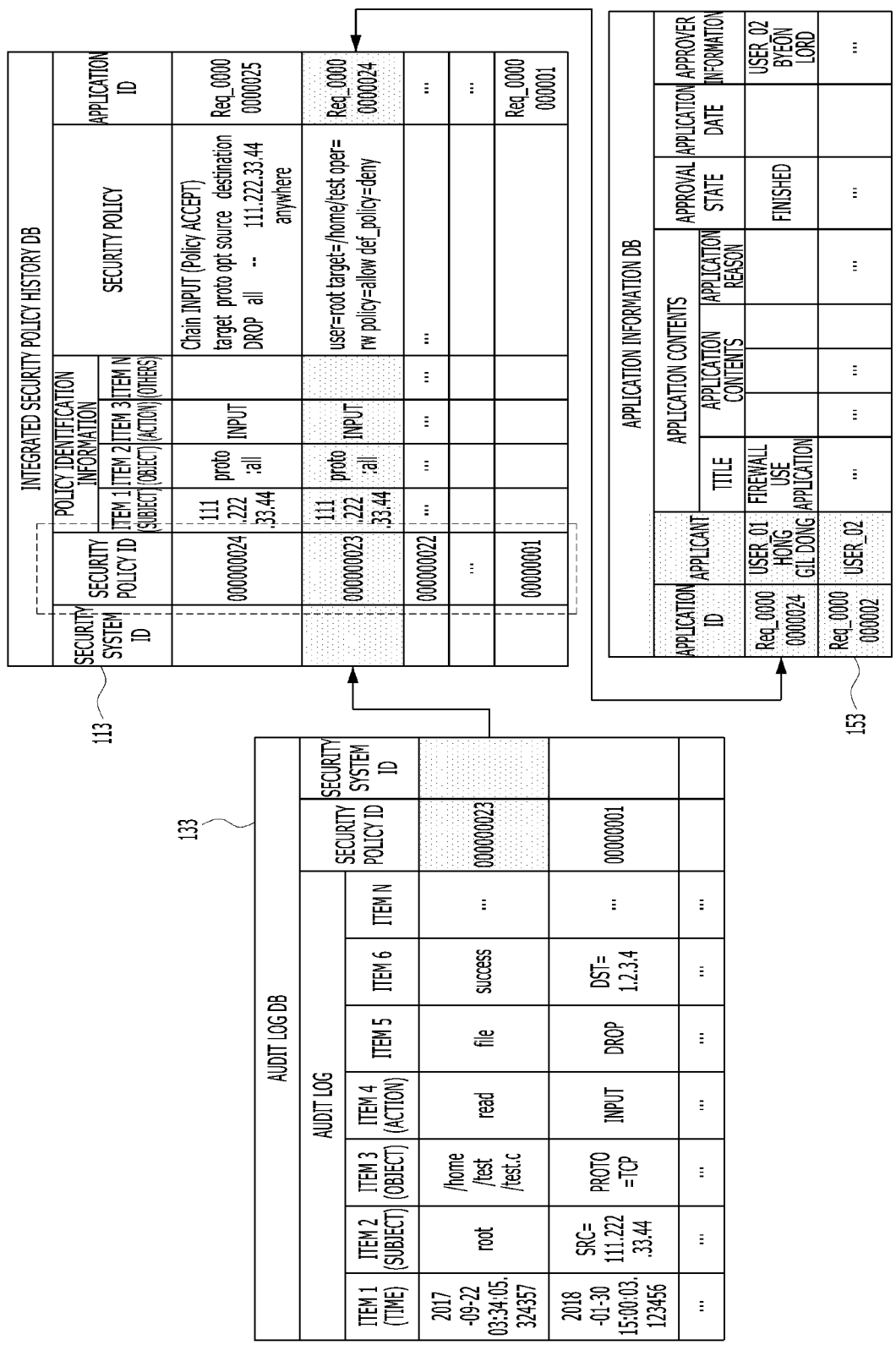
FIG. 11 is a conceptual diagram illustrating a situation where a security policy history is inquired through the audit log and the applicant information is inquired for the security policy in the security policy and audit log two-way inquiry, collation, and tracking system according to an embodiment of the present invention.

Referring to FIG. 11, the application information confirmation unit 160 may inquire the application information for the security policy by inquiring the application information DB 153 based on the application ID after confirming the application ID for the security policy by searching for the integrated security policy history DB 113 based on the security policy IDs allocated to each audit log of the audit log DB 133.

In summary, it is possible to confirm the security policy and the application information at the time of the generation of the audit log, and it is possible to track and confirm the change history of the security policy by comparing the policy contents for each history of the security policy. By mapping and managing the security policy ID and the application ID of the application information DB, it is possible to track the security policy applicant information in the audit log.

Figure 2:
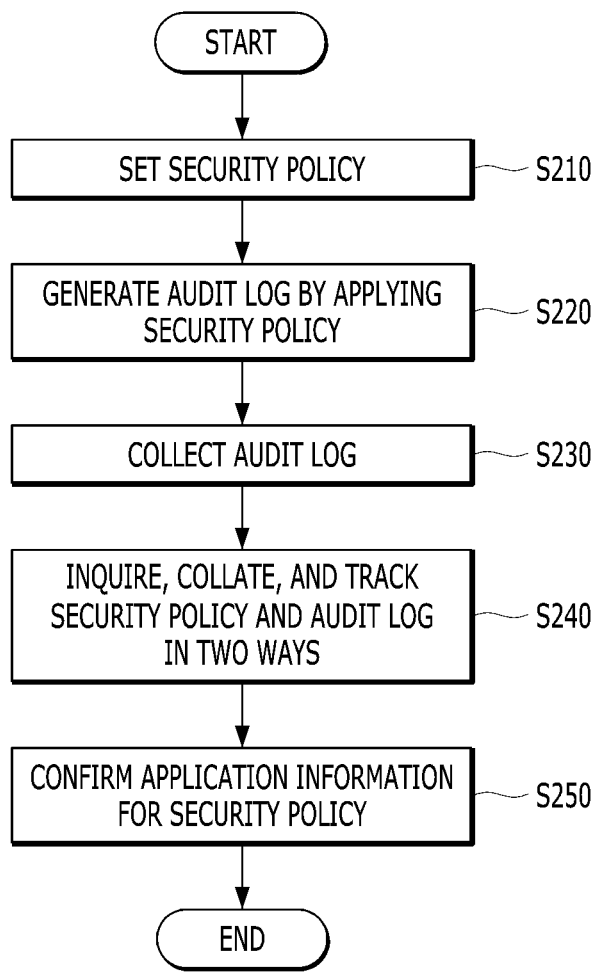
FIG. 2 is a flowchart of a security policy and audit log two-way inquiry, collation, and tracking method according to an embodiment of the present invention.

A security policy and audit log two-way inquiry, collation, and tracking method of the present invention will be described with reference to FIGS. 1 to 3.

First, the security policy setting unit 110 performs a security policy setting step (S210) of recording the security policy in the integrated security policy history DB 113 by assigning the unique policy identification information whenever the security policy is generated and changed, managing the security policy, and transmitting the security policy information to the security software agent 120. The policy identification information consists of the security policy ID or the security policy ID and the policy configuration information.

The security software agent 120 performs a security policy application step (S220) of applying the received security policy and generate an audit log by including unique security policy ID or the policy configuration information related to the generated log in the log information when a log complying with the security policy or a log violating the security policy is generated.

The audit log collection unit 130 performs a collection step (S230) of collecting the audit log, extracting the security policy ID or the policy configuration information from the corresponding audit log, mapping the collected audit log to the policy identification information by setting the security policy ID or the policy configuration information as the policy identification information, and recording the mapped audit log and policy identification information in the audit log DB 133.

The two-way inquiry tracking unit 140 performs a two-way inquiry tracking step (S240) of comparing the policy identification information recorded in the integrated security policy history DB 113 with the policy identification information recorded in the audit log DB 133 to inquire, collate and track the audit log related to the security policy, and inquire, collate, and track the security policy related to the audit log.

In the security policy setting step (S210), the policy configuration information consisting of the security policy ID capable of uniquely identifying the security policy or consisting of the security policy ID and the multiple items is generated, the security policy ID is mapped to the security policy or the policy configuration information consisting of the security policy ID and the multiple items is mapped to the security policy, and the mapped security policy ID and security policy or the mapped policy configuration information and security policy are recorded in the integrated security policy history DB 113.

In the security policy setting step (S210), the security policy without the security policy ID is collected, the policy configuration information consisting of the multiple items that include the subject information indicating the actor extracted from the corresponding security policy or the access path of the actor, the object information indicating the target to be accessed through the actor or the access path, the action information indicating the contents to be executed with respect to the target to be accessed through the actor or the access path is set, the policy configuration information consisting of the security policy ID and the multiple items is mapped to the security policy by assigning the security policy ID, and the mapped policy configuration information and security policy are recorded in the integrated security policy history DB 113.

In addition, in the security policy setting step (S210), the security policy ID is assigned to the security policy of the security software to which the security policy ID is able to be applied, the security policy ID is recorded in the integrated security policy history DB 113, the security policy information including the security policy and the assigned security policy ID is transmitted to the security software agent 120. In a case of the security software to which the security policy ID is not able to be applied, the policy configuration information is set with respect to the security policy, the security policy ID is assigned, the policy configuration information consisting of the security policy ID and the multiple items is mapped to the security policy, the mapped policy configuration information, the security policy, and the assigned security policy ID are recorded in the integrated security policy history DB 113, and only the security policy information is transmitted to the security software agent 120.

In the security policy setting step (S210), the security system ID is mapped to each security policy for the security software, and the security system ID is recorded in the integrated security policy history DB 113. In the audit log collection step (230), the security system ID is mapped for each audit log, and the security system ID is recorded in the audit log DB 133.

In the two-way inquiry tracking step (S240), the two-way inquiry, collation and tracking can be performed between the security policy and the audit log by comparing the security system ID recorded in the integrated security policy history DB 113 with the security system ID recorded in the audit log DB 133.

In the security policy application step (S220), the log is searched from the security policy information received by the security policy setting step when the log complying with the security policy or the log violating the security policy is generated, in a case in which the security policy ID of the corresponding log is present, the audit log is recorded by including the security policy ID in the log, and in a case in which the security policy ID of the corresponding log is not present in the security policy information as a result of the search, the audit log is recorded by including the policy configuration information in the log.

In the security policy application step (S220), in a case in which the security software agent is not able to include the security policy ID in the log, the audit log is recorded by including the policy configuration information that contains the subject information indicating the actor extracted from the security policy or the access path of the actor, the object information indicating the target to be accessed through the actor or the access path, the action information indicating the contents to be executed with respect to the target to be accessed through the actor or the access path, and the permission/denial information indicating whether to permit or deny the contents to be executed with respect to the target to be accessed.

In the audit log collection step (S230), in a case in which the security policy ID is recorded in the collected audit log, the security policy ID is recorded and the security policy ID is used as the policy identification information, and in a case in which the security policy ID is not recorded in the collected audit log, the policy configuration information is extracted, the integrated security policy history DB 113 is inquired by using the policy configuration information, the security policy ID is obtained, and the security policy ID is used as the policy identification information.

The information including the application ID, the applicant information of the security policy, and the security policy application contents are recorded and managed in the application information DB 153, and the application ID applying the security policy is assigned to each security policy in the integrated security policy history DB 113.

Finally, an application information confirmation step (S250) of inquiring the application information for the security policy by inquiring the application information DB 153 based on the application ID of the integrated security policy history DB 113, or inquiring the corresponding application information for the security policy by inquiring the application information DB 153 based on the application ID after confirming the corresponding application ID for the security policy by searching for the integrated security policy history DB 113 based on the security policy IDs assigned to each audit log in the audit log DB 133 may be performed.

Other detailed descriptions are omitted because they have been described in detail above.

Although the present invention has been described in detail with reference to the preferred embodiments thereof, those skilled in the art will appreciate that various modifications, additions and substitutions are possible, without departing from the scope and spirit of the invention as disclosed in the accompanying claims. It should be understood that the embodiments are to be considered in all respects only as illustrative and not restrictive.

The scope of the present invention is defined by the appended claims rather than the detailed description, and all changes or modifications derived from the meaning and scope of the claims and their equivalents are included in the scope of the present invention.

100 . . . security policy and audit log two-way inquiry, collation, and tracking system
110 . . . security policy setting unit
113 . . . integrated security policy history DB
120 . . . security software agent
130 . . . audit log collection unit
133 . . . audit log DB
140 . . . two-way inquiry tracking unit
150 . . . application information setting unit
153 . . . application information DB
160 . . . application information confirmation unit

What is claimed is:

1. A security policy and audit log two-way inquiry, collation, and tracking system comprising:

a security policy setting unit configured to record a security policy in an integrated security policy history database (DB) by assigning policy identification information whenever the security policy is generated and changed, manage the security policy, and transmit security policy information to a security software agent, wherein the policy identification information includes a security policy identification (ID) or includes the security policy ID and policy configuration information;

the security software agent configured to apply the security policy received by the security policy setting unit and generate an audit log by including the security policy ID or the policy configuration information related to the generated log in the log information when a log complying with the security policy or a log violating the security policy is generated;

an audit log collection unit configured to collect the audit log generated by the security software agent, extract the security policy ID or the policy configuration information from the audit log, map the collected audit log to the policy identification information by setting the security policy ID or the policy configuration information as the policy identification information, and record the mapped audit log and policy identification information in an audit log DB; and a two-way inquiry tracking unit configured to inquire, collate and track the audit log related to the security policy, and inquire, collate, and track the security policy related to the audit log by comparing the policy identification information recorded in the integrated security policy history DB with the policy identification information recorded in the audit log DB, wherein, in a case in which the security policy ID is recorded in the collected audit log, the audit log collection unit extracts the security policy ID and uses the security policy ID as the policy identification information, and in a case in which the security policy ID is not recorded in the collected audit log, the audit log collection unit extracts the policy configuration information, inquires the integrated security policy history DB by using the policy configuration information, obtains the security policy ID, and uses the security policy ID as the policy identification information, wherein the security policy setting unit generates the policy configuration information that includes the security policy ID capable of uniquely identifying the security policy or includes the security policy ID and the multiple items, maps the security policy ID and the security policy, or maps the policy configuration information including the security policy ID and the multiple items with the security policy, and records the mapped security policy ID and security policy, or records the mapped policy configuration information and security policy in the integrated security policy history DB, wherein the security policy setting unit collects the security policy which is predetermined such that the security policy ID of the security software agent is not assigned to the security policy, sets the policy configuration information including the multiple items that include subject information indicating an actor extracted from the security policy or an access path of the actor, object information indicating a target to be accessed through the actor or the access path, action information indicating contents to be executed with respect to the target to be accessed through the actor or the access path, maps the policy configuration information including the security policy ID and the multiple items to the security policy by assigning the security policy ID, and records the mapped policy configuration information and the security policy in the integrated security policy history DB, wherein the security software agent comprises a first security software agent and a second security software agent, the first security software agent is able to operate based on the security policy ID, and the second security software agent is not able to operate based on the security policy ID, wherein the security policy setting unit assigns the security policy ID to the security policy of the first security software agent to which the security policy ID is able to be applied, records the security policy and the assigned security policy ID in the integrated security policy history DB, transmits the security policy information including the security policy ID to the first security software agent, sets the policy configuration information with respect to the security policy of the second security software agent to which the security policy ID is not able to be applied, assigns the security policy ID, records the policy configuration information, the security policy, and the assigned security policy ID in the integrated security policy history DB, and transmits the security policy information in which the security policy ID is not included to the second security software agent, wherein the security software agent searches for a corresponding log from the security policy information received by the security policy setting unit when the log complying with the security policy or the log violating the security policy is generated, in a case in which the corresponding security policy ID of the log is present as a result of the search and the security software agent is a security software including the security policy ID in the log, the security software agent records the audit log by including a character representing an item of the security policy ID and a value of the security policy ID in the log, in text form, wherein, in a case in which the security software agent is a security software not including the security policy ID, or the security software agent is not including the security policy ID in the log as the security policy ID is not applied to the security policy even though the security software agent is the security software which is capable of including the security policy ID, the security software agent records the audit log by including the policy configuration information that contains a subject information item indicating an actor extracted from the security policy or an access path of the actor, an object information item indicating a target to be accessed through the actor or the access path, an action information item indicating contents to be executed with respect to the target to be accessed through the actor or the access path, and a permission/denial information item indicating whether to permit or deny contents to be executed with respect to the target to be accessed, in the text form for each item, and wherein the system further comprises an application information setting unit configured to record and manage information including an application ID, applicant information of the security policy, and security policy application contents in an application information DB.

2. The security policy and audit log two-way inquiry, collation, and tracking system of claim 1, wherein the security policy setting unit maps the security system ID to each security policy for the security software agent, and records the mapped security policy and security system ID in the integrated security policy history DB, the audit log collection unit maps a security system ID for each audit log, and records the mapped audit log and security system ID in the audit log DB, and the two-way inquiry tracking unit performs a two-way inquiry, collation and tracking between the security policy and the audit log by comparing the security system ID recorded in the integrated security policy history DB with the security system ID recorded in the audit log DB.

3. The security policy and audit log two-way inquiry, collation, and tracking system of claim 1, wherein the corresponding application ID applying the security policy is assigned to each security policy in the integrated security policy history DB, and wherein the security policy and audit log two-way inquiry, collation, and tracking system further comprises an application information confirmation unit configured to inquire the corresponding application information for the security policy by searching the application information DB based on the application ID in the integrated security policy history DB, or inquire the corresponding application information for the security policy by searching the application information DB based on the application ID after confirming the corresponding application ID for the security policy by searching for the integrated security policy history DB based on the security policy IDs assigned to each audit log in the audit log DB.

4. A security policy and audit log two-way inquiry, collation, and tracking method comprising:

a security policy setting step of recording and managing a security policy in an integrated security policy history database (DB) by assigning a policy identification information whenever the security policy is generated and changed and transmitting security policy information to a security software agent, wherein the policy identification information includes a security policy identification (ID) or includes the security policy ID and policy configuration information;

a security policy application step of, by the security software agent, applying the received security policy and generating an audit log by including the security policy ID or the policy configuration information related to the generated log in the log information when a log complying with the security policy or a log violating the security policy is generated;

a collection step of collecting the generated audit log, extracting the security policy ID or the policy configuration information from the audit log, mapping the collected audit log to the policy identification information by setting the security policy ID or the policy configuration information as the policy identification information, and recording the mapped audit log and policy identification information in the audit log DB; and a two-way inquiry tracking step of inquiring, collating and tracking the audit log related to the security policy, and inquiring, collating, and tracking the security policy related to the audit log by comparing the policy identification information recorded in an integrated security policy history DB with the policy identification information recorded in the audit log DB, wherein, in the audit log collection step, in a case in which the security policy ID is recorded in the collected audit log, the security policy ID is extracted and used as the policy identification information, and in a case in which the security policy ID is not recorded in the collected audit log, the policy configuration information is extracted, the integrated security policy history DB is inquired by using the extracted policy configuration information, the security policy ID is obtained, and the security policy ID is used as the policy identification information, wherein, in the security policy setting step, the policy configuration information that includes the security policy ID capable of uniquely identifying the security policy or includes the security policy ID and the multiple items is generated, the security policy ID is mapped to the security policy or, the policy configuration information including the security policy ID and the multiple items is mapped to the security policy, and the mapped security policy ID and security policy or the mapped policy configuration information and security policy are recorded in the integrated security policy history DB, wherein, in the security policy setting step, the security policy, which is predetermined such that the security policy ID is not assigned to the security policy, is collected, the policy configuration information including the multiple items that include subject information indicating an actor extracted from the security policy or an access path of the actor, object information indicating a target to be accessed through the actor or the access path, action information indicating contents to be executed with respect to the target to be accessed through the actor or the access path is set, the policy configuration information including the security policy ID and the multiple items is mapped to the security policy by assigning the security policy ID, and the mapped policy configuration information, security policy ID, and security policy are recorded in the integrated security policy history DB, wherein the security software agent comprises a first security software agent and a second security software agent, the first security software agent is able to operate based on the security policy ID, and the second security software agent is not able to operate based on the security policy ID, wherein, in the security policy setting step, the security policy ID is assigned to the security policy of the first security software agent to which the security policy ID is able to be applied, the security policy and the assigned security policy ID are recorded in the integrated security policy history DB, the security policy information including the security policy ID is transmitted to the first security software agent, the policy configuration information is set with respect to the security policy of the second security software agent to which the security policy ID is not able to be applied, the security policy ID is assigned, the policy configuration information, the security policy, and the assigned security policy ID are recorded in the integrated security policy history DB, and only the security policy information in which the security policy ID is not included is transmitted to the second security software agent, wherein, in the security policy application step, a corresponding log is searched from the security policy information received by the security policy setting unit when the log complying with the security policy or the log violating the security policy is generated, in a case in which the corresponding security policy ID of the log is present as a result of the search and the security software agent is a security software including the security policy ID in the log, the audit log is recorded by including a character representing an item of the security policy ID and a value of the security policy ID in the log, in text form, and wherein, in the security policy application step, in a case in which the security software agent is a security software not including the security policy ID in the log, or the security software agent is not including the security policy ID in the log as the policy ID is not applied to the security policy even though the security software agent is the security software which is capable of including the security policy ID, the audit log is recorded by including the policy configuration information that contains a subject information item indicating an actor extracted from the security policy or an access path of the actor, an object information item indicating a target to be accessed through the actor or the access path, an action information item indicating contents to be executed with respect to the target to be accessed through the actor or the access path, and a permission/denial information item indicating whether to permit or deny the contents to be executed with respect to the target to be accessed, in the text form for each item, and wherein the system further comprises an application information setting unit configured to record and manage information including an application ID, applicant information of the security policy, and security policy application contents in an application information DB.

5. The security policy and audit log two-way inquiry, collation, and tracking method of claim 4, wherein, in the security policy setting step, the security system ID is mapped to each security policy for the security software agent, and the mapped security policy and security system ID are recorded in the integrated security policy history DB, in the audit log collection step, a security system ID is mapped for each audit log, and the mapped audit log and security system ID are recorded in the audit log DB, and in the two-way inquiry tracking step, a two-way inquiry, collation and tracking are performed between the security policy and the audit log by comparing the security system ID recorded in the integrated security policy history DB with the security system ID recorded in the audit log DB.

6. The security policy and audit log two-way inquiry, collation, and tracking method of claim 4, wherein information including the application ID, applicant information of the security policy, and security policy application contents are recorded and managed in the application information DB and the corresponding application ID applying the security policy is assigned to each security policy in the integrated security policy history DB, and wherein the method further comprises an application information confirmation step of inquiring the corresponding application information for the security policy by searching the application information DB based on the application ID in the integrated security policy history DB, or inquiring the corresponding application information for the security policy by searching the application information DB based on the application ID after confirming the corresponding application ID for the security policy by searching for the integrated security policy history DB based on the security policy IDs assigned to each audit log in the audit log DB.

* * * * *